United States Patent Office 3,482,808
Patented Dec. 9, 1969

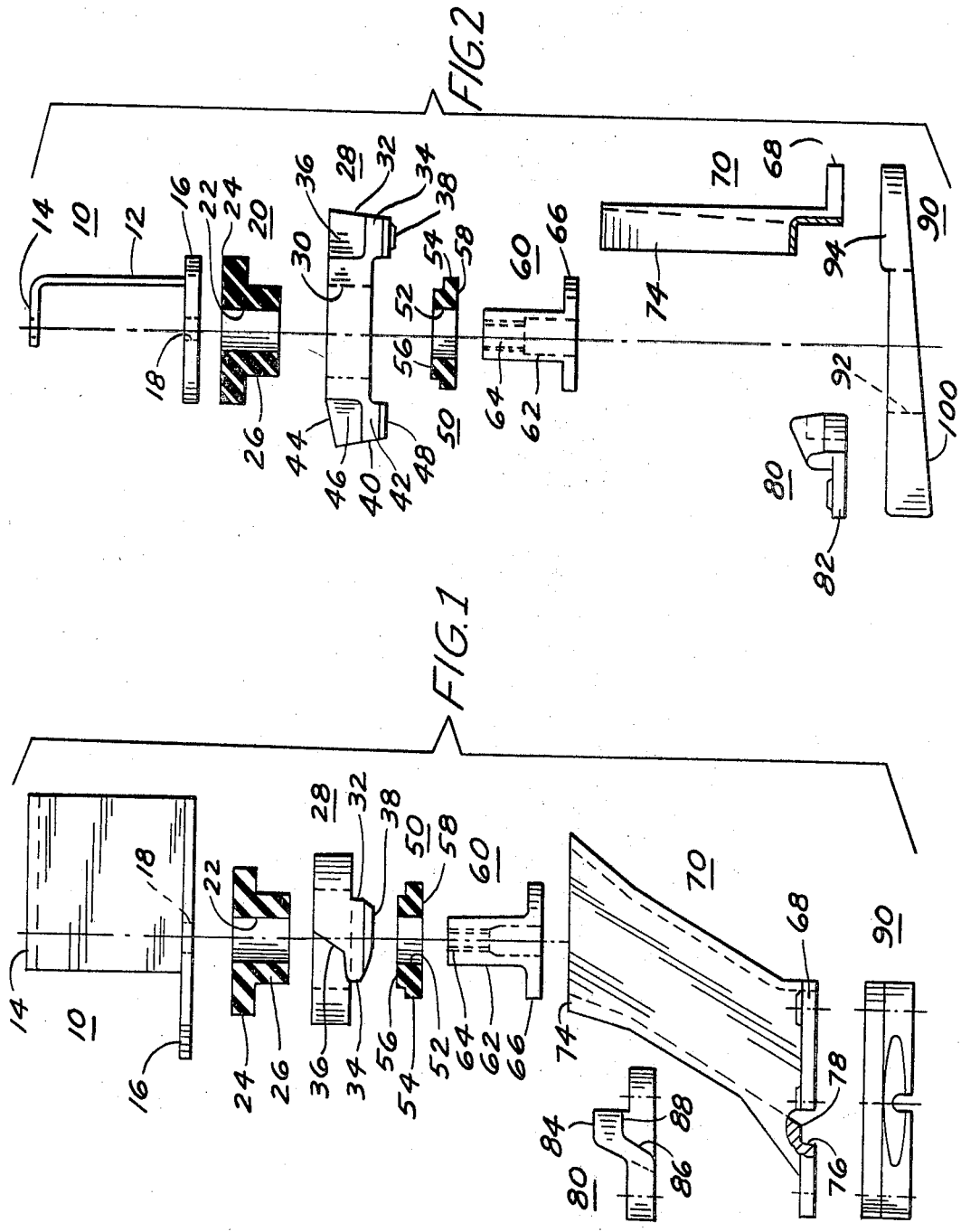

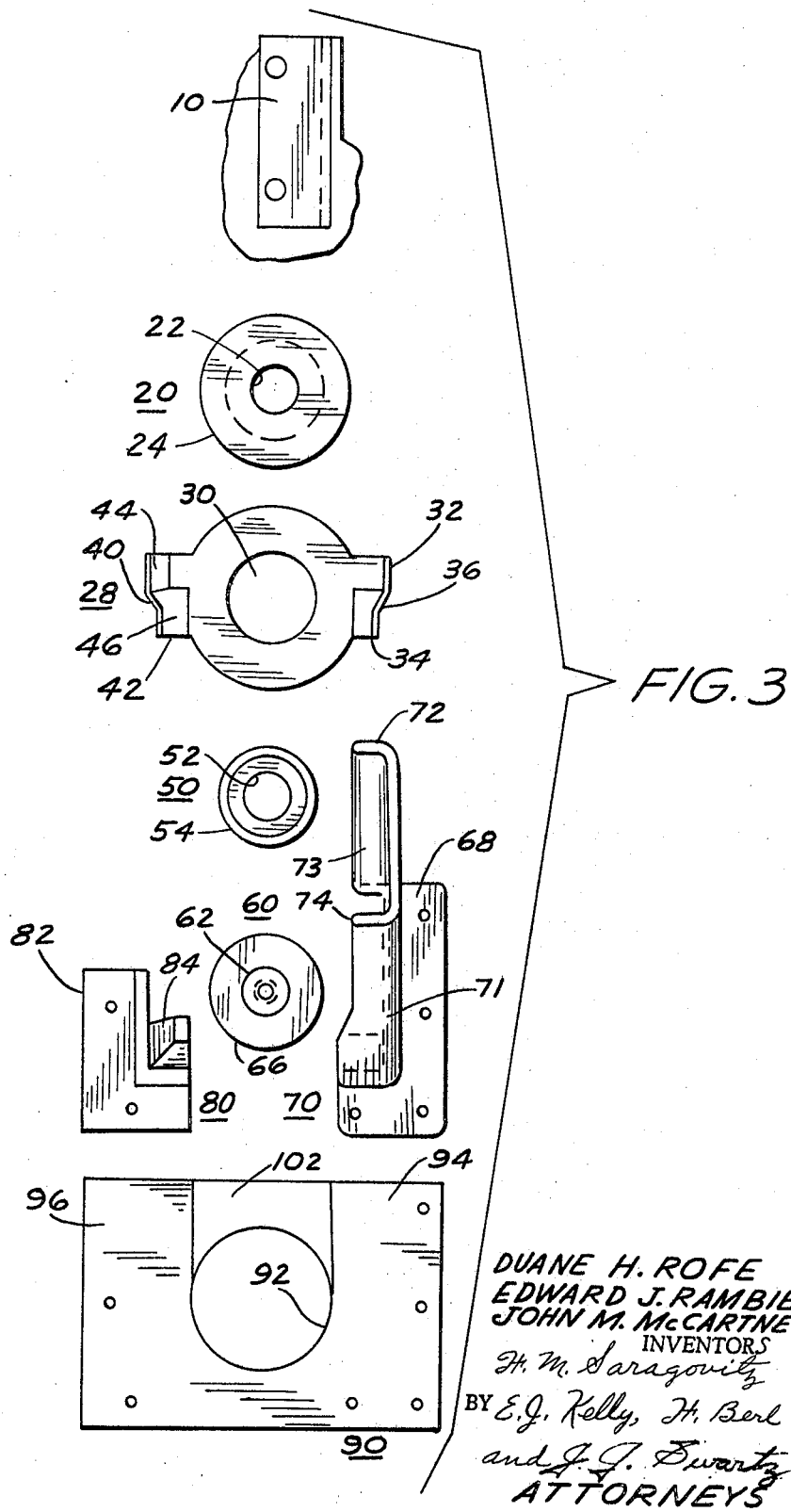

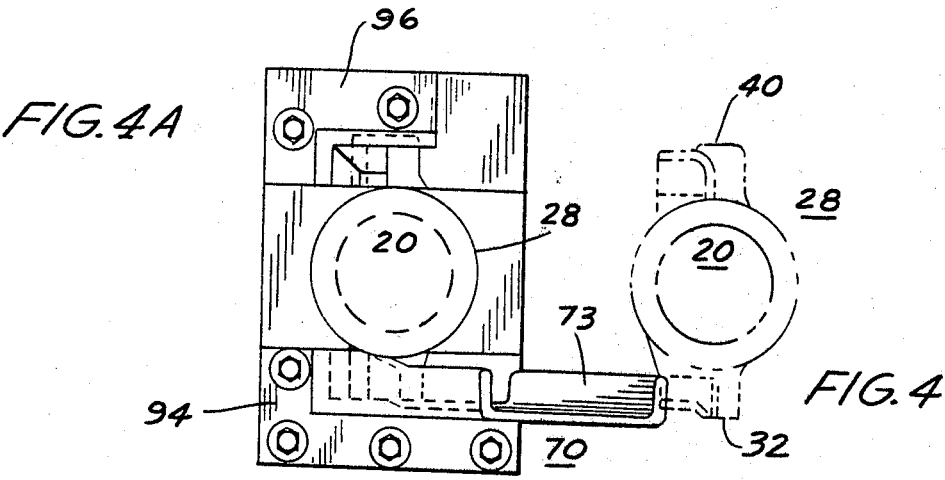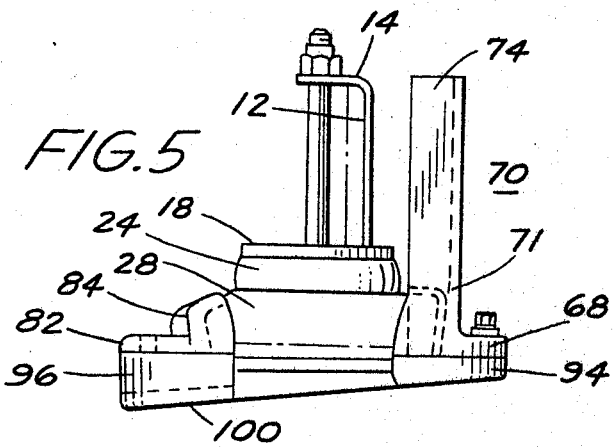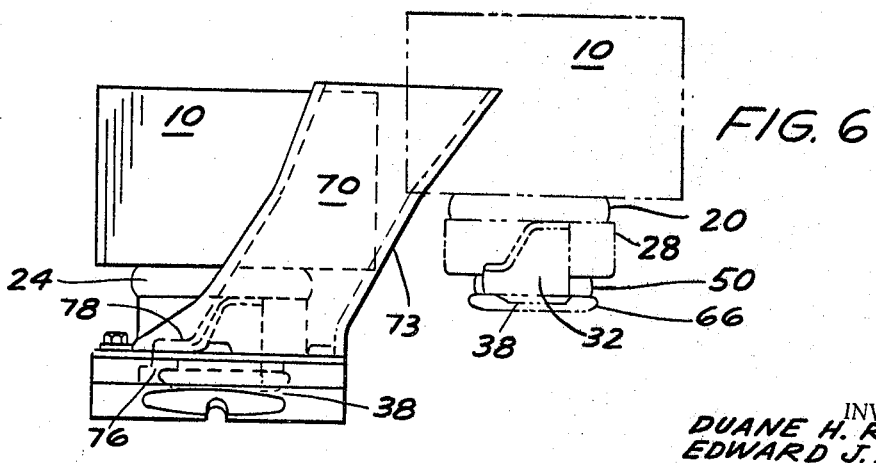

3,482,808
ENGINE MOUNT AND VIBRATION ISOLATOR
Duane H. Rofe, Lake Orion Township, Oakland County, Edward J. Rambie, Birmingham, and John M. McCartney, Grosse Pointe, Mich., assignors, by mesne assignments, to the United States of America as represented by the Secretary of the Army
Filed Mar. 20, 1968, Ser. No. 714,707
Int. Cl. F16f 15/08; B60k 5/00
U.S. Cl. 248—9  4 Claims

ABSTRACT OF THE DISCLOSURE

An engine mount and vibration isolator for mounting a vehicle engine which has no moving parts. The mount and isolator has a foot-shaped portion which is attached to the engine and a shoe-shaped portion into which the foot-shaped portion is adapted to be securely mounted.

---

This invention relates to an engine mount and vibration isolator for land vehicles. In particular, this invention relates to an engine mount and vibration isolator for land vehicles which restrains the engine from lateral roll and vertical movement and isolates engine vibration in addition to acting as a shock mount.

In the past, mounting of internal combustion engines in vehicles was cumbersome, time consuming, and generally required many people to properly secure the engine. The prior art engine mounting devices were of a permanent nature and therefore the removal of the engine for necessary repairs, etc., required the expenditure of much time and many man hours. This problem becomes particularly acute when engines must be replaced under military combat operations wherein limited men and material are available. Under these conditions, the interchange of engines has been often impossible. With the new improved device according to the invention, however, the engine may be readily exchanged with relativeyl little expenditure of manpower.

Engine mounts are commonly secured to the underside of engines and therefore are relatively inaccessible. This has resulted in at least two prior devices which have proved unacceptable. One of these devices is a remotely actuated type engine mount. This device is relatively expensive and requires much repair work. In addition these systems are relatively sensitive to adverse environmental conditions and are therefore unsatisfactory, particularly under varied military conditions.

Another type of mounting device which has been used in the past is a mount which automatically locks. This later type device has also proved unsatisfactory because of the relatively high expense and poor reliability. Moreover, these prior art devices had many moving parts. These moving parts would often become inoperable due to rusting and/or clogging by sand and/or mud. An example of such a prior art device was a mount which incorporated movable clamps which were actuated by means of screw jacks. These screw jacks often became encrusted with sand and hence became inoperable.

The present invention has to provide a quick and easy means for installing and removing internal combustion engines from land vehicles. The present invention has provided an engine mount and vibration isolator which has no moving parts. For convenience, this device will be alternately referred to in abbreviated form as an engine shock mount throughout the specification. More particularly, this invention provides an engine mount which has at least one support mount secured to the underside of an engine. The support has foot-shaped portions integrally formed therewith which fit into shoe-shaped portions formed in guides. The guides are securely mounted in the support blades which are secured in the vehicle or other support means.

It is therefore an object with the present invention to eliminate the aforesaid disadvantages.

It is another object of the present invention to provide a mount and vibration isolator for an internal combustion engine which will provide rapid ingress and egress of the engine.

It is yet another object of the present invention to provide an engine mount and vibration isolator which is simple, inexpensive, and yet sufficiently rugged to withstand large forces due to extreme field conditions.

Yet another object of the present invention is to provide an engine mount which in combination with a transmission mount will firmly secure an engine and yet permit rapid installation and removal of the engine.

Other objects and advantages of the present invention will become apparent to those of ordinary skill in the art when considered in relation to the accompanying drawing of which:

FIG. 1 is a side view of the engine mount and vibration isolator, parts broken way in section, shown in disassembled spaced relation.

FIG. 2 is a front view of the engine mount and vibration isolator, parts shown in section, shown in disassembled spaced relation.

FIG. 3 is a top view of the parts of the engine mount and vibration isolator shown in disassembled space relation.

FIGS. 4 and 4a are top views of the support mount and vibration isolator prior to/and subsequent to installation in the shoe-shaped portions of the guides respectively.

FIG. 5 is a front view of the engine mount and vibration isolator locked in position in the guide means.

FIGS. 6 and 6a are side views of the assembled engine mount and vibration isolator prior to/and subsequent to installation in the guide means respectively.

Referring now to the drawing wherein like numerals will refer to like parts in the various figures, the support bracket which holds the engine will be formed as indicated generally at 10. Support bracket 10 has plate 12 extending vertically with flange 14 extending laterally at its outer edge. Support bracket 10 also has a base member 16 attached to plate 12, with an aperture 18 extending therethrough to receive a securing bolt (not shown). The support bracket 10 which supports the engine is mounted on a first rubber grommet indicated generally at 20. Extending through rubber grommet 20 is bore 22. The diameter of the body portion of grommet 20 indicated at 26 is slightly larger than the bore 30 of the support mount, which is indicated generally at 28, thereby providing an interference fit for the grommet 20 and the support 28. Grommet 20 also has a flange 24 extending thereabout which rests on the top face of support mount 28.

Support mount 28 has a foot-shaped portion which will be designated as main foot 32. Main foot 32 has a toe portion 34, slanted portion 36, and a runner 38 which is located at the bottom of the foot. Located on the opposite side of the support mount 28 is a second foot-shaped portion 40 which will be designated the mi or foot support. This foot-shaped portion similarly has a toe-portion indicated at 42, a slanted top-portion 44, a slanted front-portion 46, and a runner at the bottom of the minor foot support indicated at 48.

A second rubber grommet 50 is provided which has a body portion and a flange 54 extending thereabout, upper and lower surfaces 56 and 58 and a bore extending therethrough indicated at 52. The grommet 50 is placed into the bore 30 of support mount 28 until it comes in contact with the first grommet 20 which has been previously placed in bore 30.

Insert 60, having a stem 62 and flange 66, is utilized to secure grommet 50 to support mount 28. A threaded portion 64 of insert 60 is adapted to receive a bolt (not shown) which extends from the support bracket 10 through bores 22 and 52 into the threaded portion 64. Rather than using thread 64, a bolt or other suitable securing means may be attached to the bolt which holds the various pieces together. As mentioned before, however, the bolt will be threaded at 64 to secure the various pieces into interfitting relation. The insertion of rubber grommets 20 and 50 into bore 30 in force fitting relation causes the portions within the bore to be in tension and the flange portions 24 and 54 to be in compression. This assists in attenuating some of the vibration loads. That portion of the invention already described will be a part of the engine proper and will accompany the engine prior to insertion in the vehicle and/or supporting device.

In order to secure the engine with its support mount into the vehicle or other transporting means, a main guide 70 is provided. Main guide 70 has a flanged mounting plate 68 and guiding flanges 72 and 74. Flanges 72 and 74 extend at an angle with respect to base 68. Surface 73 of flange 72 provides the support for foot-shaped portion 32 as the support mount is placed in position. When the engine is to be placed in position, the foot-shaped portion 32 will slide down slanted surface 73 of flange 72. As shown best in FIG. 1, main guide 70 has a portion 76 against which toe 34 abuts and surface 78 which prevents toe 34 from raising vertically. When the foot-shaped portion 32 slides down surface 73 of flange 72, it will eventually rest in position as shown in FIG. 6a. As best shown in FIG. 5, guide 70 is tapered at 71 which causes the engine to be correctly positioned in a lateral direction and removes play between the mount and isolator and the main guide 70.

A minor support shoe is provided as indicated generally at 80 for receipt of minor support foot 40. Minor support shoe 80 has a flange 82 with raised portion 84 for receiving foot 40. The toe 42 of foot 40 will abut against portion 86 as shown in FIG. 1 to prevent the support mount from moving forward. Portion 88 of raised portion 84 will prevent the minor foot-support 40 from raising vertically. As can best be seen in FIG. 1 and FIG. 6a, main guide 70 has a shoe-shaped portion shown at 76 and 78 which is adapted to receive the foot-shaped portion 32. Similarly, shoe-shaped portion 84 and 82 are adapted to receive shoe-shaped portion 40 of support mount 28.

To prevent the guide and support shoe from moving, a support block 90 is welded or otherwise suitably secured to the vehicle or other transportation means or supporting means. As shown in FIG. 2, support block 90 has a bore 92 through which flange 66 of insert 60 rests when the foot 32 is in the locked position as shown in FIG. 6a. The support block 90 is thick enough such that flange 66 does not extend completely through bore 92, hence permitting limited deflection of the support mount. Support block 90 is provided with flange 94 on which main guide 70 is secured by bolts or other suitable securing means. On the opposite side of support block 90 is flange 96 upon which minor support shoe 80 is rigidly secured by any suitable mechanical means. A slanted face 100 is provided which rests against the bottom of the vehicle and/or other support surface which is generally slanted, hence providing for level engine support. Obviously, a flat surface may be utilized if desired.

With the guide 70 and minor support shoe 80 securely fastened to support block 90, the engine is rigidly secured against either lateral or vertical movement. As can thus be seen in FIGS. 1 and 6a, the toe 34 of foot 32 abuts against face 76 of the shoe-shaped portion of main guide 70. On the opposite side of the engine support, toe 42 of shoe 40 abuts portion 86 of shoe 80. The combination of these two complimentary shoe and foot portions necessarily prevents any forward movement of the shock mount. The top portion of toe 34 abuts surface 78 of the shoe shaped portion of guide 70. Similarly, on the opposite side of the mount, the top of toe 42 abuts surface 88 of minor support shoe 80. Hence the shoe and foot support combination prevents vertical movement of the engine. Movement in a rearward direction is prevented by both the weight of the vehicle providing a forward component force in opposition to any movement thereof and also by means of any suitable mount which may be provided on the rear portion of the engine. As is well known any three point suspension is sufficient to mount the engine, therefore, if two shock mounts are provided on the underside of an engine, only one mount is necessary at the rear portion of the engine, to prevent it from moving rearward. Another commonly used and aceptable means for preventing rearward movement of the engine is to utilize transmission mounts which are generally mounted at the rear of the power train. Here again, only one transmission mount is necessary to restrain the engine from moving rearwardly.

In operation, support block 90 is welded or otherwise secured to the vehicle or other storing or transportation means. Main guide 70 and minor support shoe 80 are then secured to support 90. The engine will then be readied by securing support bracket 10 to the engine. Rubber grommets 20 and 50 will then be secured in support mount 28 and insert 60 will be inserted into bores 50 and 22. A bolt, not shown, is inserted through aperture 18, bore 22, bore 52, and into insert 60. The bolt may be either threaded at 64 or made sufficiently long so as to extend through insert 60 to permit a nut to be secured to the bolt. The nut and bolt are then tightened so as to secure the various parts of the support mounting in interlocking relation. The engine thus readied is then lifted above the main guide 70. Foot-portion 32 is placed against surface 73 of flange 72 and the engine is lowered. As the engine is lowered, the flange 66 of insert 60 will eventually come to rest within bore 92 of block support 90 until flange 66 comes to rest against recessed portion 92 of support block 90. The engine can then be urged forward until toe-34 abuts surface 76 and toe-42 abuts surface 86. The rear locking means may then be secured and the engine will then be prepared for shipment and for use depending on the vehicle the engine is installed on.

It can thus be seen that an engine mount and vibration isolator has been provided which has no moving parts. The engine mount is automatic and self locking. The engine mount is simple, yet rugged and reliable and one that requires very little maintenance due to the removal of all the moving parts. As is obvious in the drawings the engine may be removed as readily as it was inserted by merely removing the rearward mount (not shown) which prevents rearward movement of the vehicle, urging the engine or power pack slightly to the rear, and then raising the engine so that foot-shaped portion 32 is directed out by main guide 70. The invention does not require a large amount of manpower and is a valuable timesaving mechanism. Since it is obvious that many changes and modifications can be made in the above described details without departing from the nature and spirit of the invention it is to be understood that the invention is not limited to said details.

What we claim is:

1. An engine mounting device and vibration isolator comprising:
    a support bracket on which said engine is mounted;
    a support mount having
        a bore extending therethrough
        a first foot-shaped portion, and
        a second foot-shaped portion mounted opposite
            said first foot-shaped portion;
    a first grommet having a body portion secured within said bore of said support mount and
a flange portion on which said support bracket is mounted;
a second grommet having
a body portion extending through said bore in abutting relation with said body portion of said first grommet and
a flange portion,
an insert having
a flange portion which is mounted against said flange portion of said second grommet, and
a stem portion extending through aligned bores in said first and second grommets;
a guide assembly having
a channel shaped guide portion to assist the assembly of the mounting device,
a flanged mounting plate, and
a shoe shaped receiving portion which is adapted to receive said first foot-shaped portion of said support mount;
a support means having
complementary receiving portion into which said second foot-shaped portion of said support mount is secured;
and a support block on which said mounting plate of said guide assembly and said support means are mounted having an aperture therein which is adapted to receive said flange of said insert.

2. An engine mounting device and vibration isolator for a vehicle comprising:
a pair of spaced support mounts adapted to be secured to the engine each having first and second foot-shaped portions thereon adapted to be secured;
a pair of spaced support blocks adapted to be secured to the vehicle each having mounted thereon a guide assembly and a minor support shoe;
said guide assembly having a channel shaped portion, a flanged mounting plate, and a shoe-shaped receiving portion which is adapted to receive said first foot-shaped portion of said support mount;
said pair of blocks being arranged such that their guide assemblies and minor support shoes are mirror images of each other;
each of said channel shaped guide portions extending rearwardly at an angle such that the opposed faces of its inwardly directed flanges provide a slide for guiding its associated foot-shaped portion into engagement with the shoe-shaped portion of the guide assembly;
said minor support shoe each having a complimentary receiving portion into which said second foot-shaped portion of the support mounts is secured; and
said channel guides being spaced laterally to allow initial play between the feet of said engine support mounts and said guides, each channel guide being tapered inwardly adjacent its mounting plate to insure correct lateral positioning of the engine.

3. An engine mounting device and vibration isolator according to claim 2 further characterized by:
first and second resilient grommets inserted in a bore formed in each support mount for absorbing engine shock; and
an insert having a flange portion and a stem portion, said stem extending through aligned bores formed in said first and second grommets, said block having an aperture adapted to receive said insert flange.

4. An engine mounting device and vibration isolator according to claim 3 wherein:
said first grommet comprises a first body portion which extends within said bore and a flange portion bearing against a first face of said support mount; and
said second grommet comprises a first body portion which extends through said bore in abutting relation with said first grommet body and a flange portion bearing against a second face of said support mount.

References Cited

UNITED STATES PATENTS

| 3,035,799 | 5/1962 | Pierce | 248—15 |
| 3,333,707 | 8/1967 | Bange et al. | 248—15 X |
| 3,402,782 | 9/1968 | Ljungstrom | 180—64 |

FOREIGN PATENTS

| 590,041 | 7/1947 | Great Britain. |
| 929,558 | 6/1963 | Great Britain. |

ROY D. FRAZIER, Primary Examiner

J. FRANKLIN FOSS, Assistant Examiner

U.S. Cl. X.R.

180—64; 267—1